Nov. 24, 1942.   M. SHOELD   2,302,807
APPARATUS FOR TREATING GASES
Filed March 6, 1940   2 Sheets-Sheet 2

Inventor:
Mark Shoeld.
Frank H. Wisch.
Attorney

Patented Nov. 24, 1942

2,302,807

UNITED STATES PATENT OFFICE 2,302,807

APPARATUS FOR TREATING GASES

Mark Shoeld, Towson, Md., assignor to The Davison Chemical Corporation, Baltimore, Md., a corporation of Maryland Application March 6, 1940, Serial No. 322,629

4 Claims. (Cl. 183—4)

This invention relates to improvements in apparatus for treating gases and more particularly to improved means for dehumidifying air.

In apparatus employed for contacting gases with contacting materials, means have heretofore been used for providing a movable bed for such materials to continuously maintain active portions thereof exposed to gas to be treated. Such means are used in apparatus for dehumidifying air in which apparatus the contacting materials used are adsorbing agents such as silica gel, alumina gel, anhydrous calcium sulphate and the like.

One type of dehumidifying apparatus in extensive use comprises a rotary drum made up of two concentric cylinders formed of perforated metal sheeting or of wire mesh screen. The space between the cylinders is filled with adsorbing agents such as those mentioned. The drum rotates about a horizontal axis and as it does so the bed of adsorbing material is moved alternately through an adsorption zone and an activation zone. Wet air passing through the moving bed in the adsorption zone is dehumidified. The adsorbent carrying the removed moisture passes into the activation zone where the bed is heated to evaporate and drive out the adsorbed water. After removal of the adsorbed water the reactivated bed is passed into the adsorption zone and the above operation is repeated.

The adsorbent material, such as silica gel and others, used in the bed is placed therein in the form of relatively small lumps. The material in the bed must not be too fine since the resistance to the flow of air therethrough is apt to be too high and thus reduce the efficiency of the apparatus. Since the lumps of adsorbent material are frangible, it is important that these lumps be kept from disintegrating while the bed is in motion. Besides the possibility of causing packing and obstruction of passages in the bed, fines produced by disintegration tend to sift out of the bed or settle therein. As the masses of adsorbent become progressively smaller, movement thereof increases and losses by attrition are accentuated. Channeling eventually occurs which renders proper functioning of the contact apparatus impossible.

In the present invention, masses of adsorbent material are retained in substantially fixed positions relative to each other in a movable bed to prevent frictional engagement of the said masses with each other while the bed is moving and while gas is passing therethrough. The disintegration of the said masses of adsorbent material and the disadvantages incidental thereto are thereby avoided.

For the purpose of illustrating the present invention, reference is made to the accompanying drawings, in which, Figure 1 is a vertical sectional view, drawn more or less diagrammatically, of a rotary type of dehumidifying apparatus showing masses of adsorbent material in a movable bed;

Figure 1:
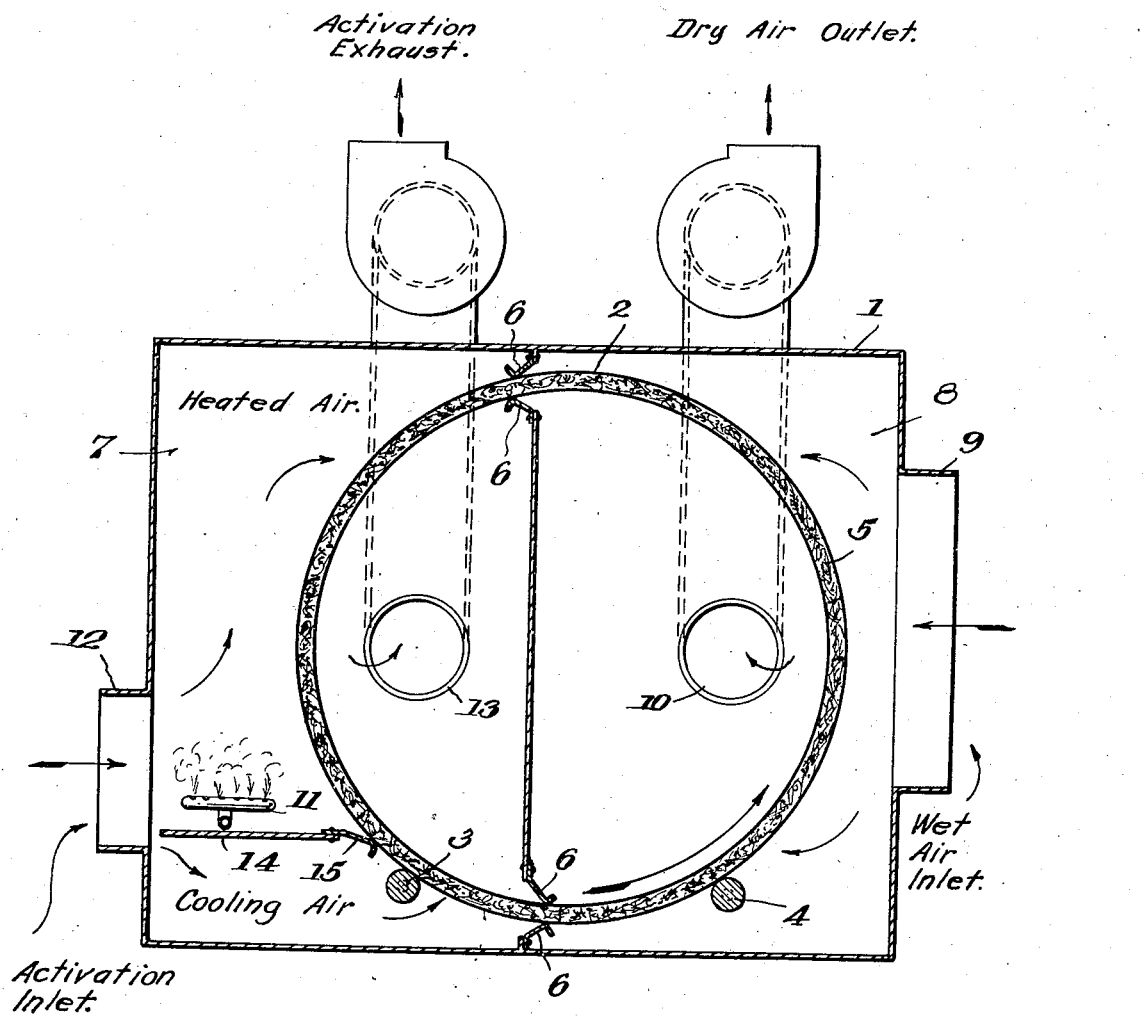

The apparatus shown diagrammatically in Figure 1, comprises an enclosure 1 within which is mounted a rotary drum 2 supported on two horizontal shafts 3 and 4 which are in turn supported at each end in bearings (not shown) attached to the frame of the enclosure 1. The supporting shafts are rotated by a small geared motor (not shown), and they in turn cause the drum to rotate.

The drum comprises two concentric cylinders having a space 5 therebetween in which are positioned masses of adsorbent material such as silica gel, alumina gel, anhydrous calcium sulphate or the like. These masses are positioned in the space 5 in a manner to be described in greater detail below. Briefly, the masses of adsorbent material are held in position in the space 5 to prevent movement thereof relative to each other during rotation of the drum.

Dividing seals 6 on the inside and outside of the drum 2, extending lengthwise of the drum parallel to its axis of rotation, form two compartments 7 and 8 in the enclosure 1. The compartment 7 may be designated as the activation or reconditioning zone, and the compartment 8 as the adsorption zone. An air inlet 9 is provided in the enclosure 1 for introducing wet air into the compartment 8 outside of the drum 2. An air outlet 10 is provided in the compartment 8 within the drum 2 for the withdrawal of dehumidified air. The inner and outer cylinders of the drum 2 being perforated, the air to be treated is drawn radially through the space 5 into contact with the adsorbent and the dried air passes out through the outlet 10.

As the drum 2 rotates, the adsorbent in the portion of the space 5 in the compartment 8 dries the air while the adsorbent in the portion of the space 5 in the compartment 7 is being reconditioned. To recondition the adsorbent a heater 11 which may be a gas burner is provided in the compartment 7 outside the drum 2. Air is drawn through an inlet 12, is heated by the heater 11, and the heated air on passing through the space 5 in the compartment 7 drives off the adsorbed moisture and carries it through an exhaust 13. A baffle 14 provided with a seal 15 directs unheated air through the lower portion of the drum 2 in the compartment 7. The reconditioned adsorbent is thereby cooled before it enters the compartment 8.

Figure 2:
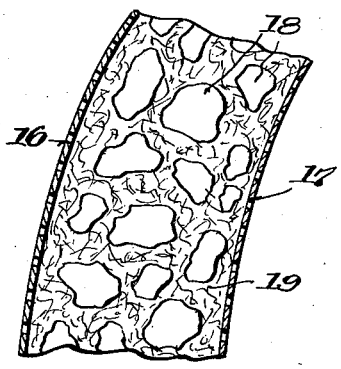
Figures 2, 3 and 4 are sectional views of fragments of a movable bed showing various arrangements of the masses of adsorbent material.
Figure 3:
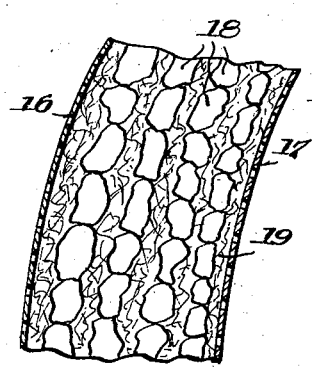
Figure 4:
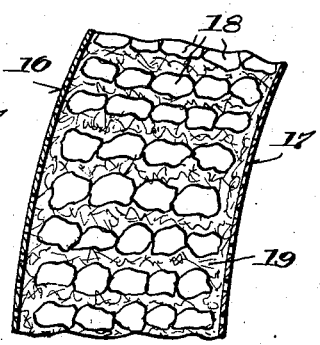

As indicated above, masses of adsorbent material are supported substantially rigidly within the space between the concentric perforated cylinders 16 and 17 of the drum 2 as shown in Figures 2, 3 and 4. The particles 18 of adsorbent materials, in the form of pellets or in the form of lumps irregular in shape, may be from ⅛ inch to ¼ inch in diameter. They may be placed in on particular order as shown in Figure 2, and may be held spaced apart by means of inert fibrous material 19, such as glass wool, rock wool or the like or relatively corrosion-resistant metallic wools such as brass wool. Or, the particles of adsorbent material may be placed in juxtaposition or in contact with each other in concentric layers (as in Figure 3) or in layers extending radially (as in Figure 4) in the space 5. The inert fibrous material 19 is placed between the layers and thus the layers are held spaced apart. The fibrous material in contact with the individual masses prevents movement of the masses relative to each other while the drum 2 is rotating.

If desired, the particles of adsorbent material may be so arranged in the space 5 that the larger particles are near the outer cylinder and the smaller particles near the inner cylinder as illustrated in Figure 3. This arrangement tends to increase the efficiency of the apparatus.

Figure 5:
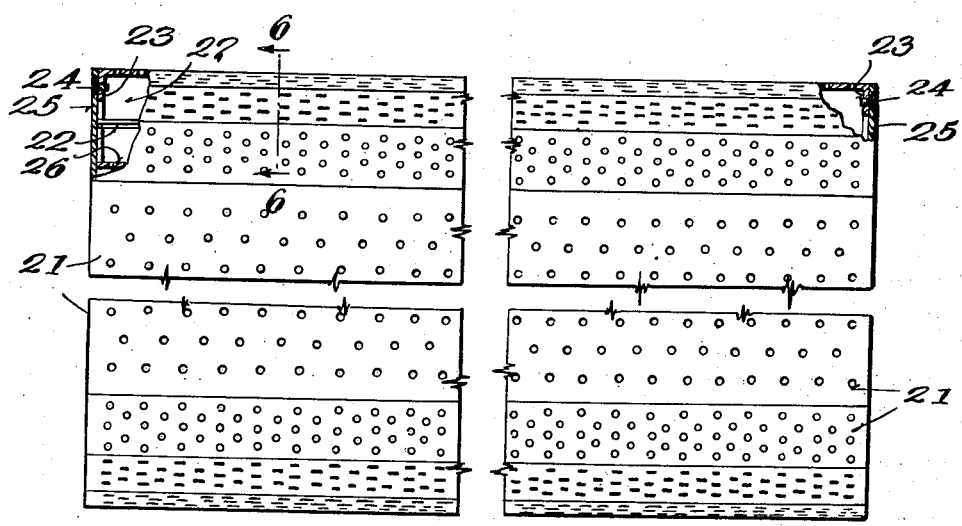
Figure 5 is a view of the outside of a perforated rotary cylinder (partly in section) used in apparatus of the type shown in Figure 1; and, Figure 6 is a sectional view on line 6—6 of the portion of the drum shown in Figure 5, which latter figure is somewhat reduced in size as compared with Figure 6.
Figure 6:
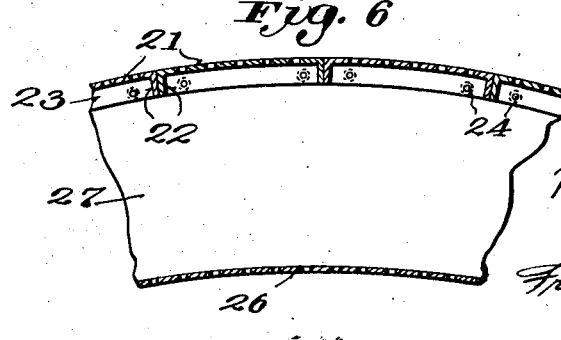

As shown in Figures 5 and 6, the outer cylinder of the rotary drum illustrated in Fig. 1, may be constructed of relatively narrow, perforated, removable sections 21 having flanges 22 along their sides and a flange 23 at each end. The flanges 22 serve as reinforcing means and the end flanges 23 serve as means for fastening the sections by means of counter-sunk screws 24 (suitably sealed) to the annular end plates 25 of the drum. The sides of the sections 21 are brought into abutment to form a relatively smooth outer cylindrical surface. The inner perforated cylinder 26 may be in one piece and each end thereof fastened, as by welding or other means, to the inner edge of the adjacent annular plate 25. It is thus seen that the annular space 27 is readily accessible upon removal of a section 21 and that the masses of absorption material and the inert fibrous material or the equivalent thereof may be placed and arranged as desired in the bed.

By means of the improvements described above the contact material performs its function without causing a variation in the flow of gas through the bed. Furthermore, considerably less contact material is needed for replacement purposes since the physical condition of the material remains relatively permanent.

What is claimed is:

1. In apparatus for dehumidifying air, which apparatus comprises an adsorption zone, an activation zone, and a bed containing solid undivided masses of frangible adsorbent material movable through the said zones; the said undivided masses being spaced apart in the bed by inert fibrous material and held thereby from frictional engagement with each other while the said bed is being moved, to thereby avoid disintegration of the said undivided masses.

2. In apparatus for dehumidifying air, which apparatus comprises a rotary drum composed of two concentric perforated cylinders rotatable about a horizontal axis, solid undivided masses of adsorbent material in the space between the cylinders, an adsorption zone and an activating zone through which the adsorbent material alternately passes upon rotating the drum; the said undivided masses of adsorbent material being arranged in spaced concentric layers in the said space between the cylinders and held in said layers to prevent movement of the said undivided masses relative to each other during rotation of the said drum, to thereby avoid disintegration of the said undivided masses.

3. In apparatus for dehumidifying air, which apparatus comprises a rotary drum composed of two concentric perforated cylinders rotatable about a horizontal axis, solid undivided masses of adsorbent material in the space between the cylinders, an adsorption zone and an activating zone through which the adsorbent material alternately passes upon rotating the drum; the said undivided masses of adsorbent material being arranged in layers positioned radially in the space between the cylinders, and fibers in said space for holding said layers in position to prevent movement of the said undivided masses relative to each other during rotation of the said drum, to thereby avoid disintegration of the said undivided masses.

4. Apparatus for treating gases, comprising a movable chamber having therein solid undivided fragments of frangible absorbing composition, and inert fibers distributed in spaces between the said fragments for holding the fragments against frictional engagement with each other while moving said chamber, to thereby avoid disintegration of the said fragments.

MARK SHOELD.